US011226876B2

(12) United States Patent
Gottapu et al.

(10) Patent No.: US 11,226,876 B2
(45) Date of Patent: Jan. 18, 2022

(54) NON-BLOCKING BACKUP IN A LOG REPLAY NODE FOR TERTIARY INITIALIZATION

(71) Applicant: SAP SE, Walldorf (DE)

(72) Inventors: Simhachala Sasikanth Gottapu, Dublin, CA (US); Yahong Wang, Dublin, CA (US); Nandan Marathe, Pune (IN); Anant Agarwal, Mangalore (IN)

(73) Assignee: SAP SE, Walldorf (DE)

( * ) Notice: Subject to any disclaimer, the term of this patent is extended or adjusted under 35 U.S.C. 154(b) by 882 days.

(21) Appl. No.: 16/014,206

(22) Filed: Jun. 21, 2018

(65) Prior Publication Data

US 2019/0391884 A1    Dec. 26, 2019

(51) Int. Cl.
*G06F 11/14* (2006.01)
*G06F 11/20* (2006.01)
*G06F 16/27* (2019.01)

(52) U.S. Cl.
CPC ...... *G06F 11/1471* (2013.01); *G06F 11/1407* (2013.01); *G06F 11/1464* (2013.01); *G06F 11/1469* (2013.01); *G06F 11/2056* (2013.01); *G06F 16/27* (2019.01); *G06F 2201/80* (2013.01); *G06F 2201/87* (2013.01)

(58) Field of Classification Search
CPC .................................................. G06F 11/1471
See application file for complete search history.

(56) References Cited

U.S. PATENT DOCUMENTS

| 9,922,061 | B2* | 3/2018 | Paksoy | G06F 11/1451 |
| 2004/0044865 | A1* | 3/2004 | Sicola | G06F 11/2007 711/162 |
| 2005/0216524 | A1* | 9/2005 | Gomes | G06F 16/273 |
| 2005/0268068 | A1* | 12/2005 | Ignatius | G06F 3/067 711/202 |
| 2007/0156774 | A1* | 7/2007 | Gomes | G06F 16/284 |
| 2007/0185937 | A1* | 8/2007 | Prahlad | G06F 16/184 |
| 2009/0119665 | A1* | 5/2009 | Venkitachalam | G06F 11/2038 718/1 |
| 2011/0085545 | A1* | 4/2011 | Tadimeti | H04L 45/50 370/389 |
| 2013/0006941 | A1* | 1/2013 | Asakura | G06F 11/1471 707/648 |
| 2014/0019415 | A1* | 1/2014 | Barker | G06Q 10/0639 707/643 |

* cited by examiner

*Primary Examiner* — Charles E Lu
(74) *Attorney, Agent, or Firm* — Sterne, Kessler, Goldstein & Fox P.L.L.C.

(57) ABSTRACT

Disclosed herein are system, method, and computer program product embodiments for non-blocking backup for tertiary initialization in a log replay only node. An embodiment operates by performing a standard log replay on a secondary server and briefly suspending the standard log replay in response to tertiary initialization. Further, the secondary server may determine backup block information and perform a page-aligned backup process from the secondary server to a tertiary server. Additionally, the secondary server may determine log replay block information, and perform a modified log replay concurrently with the backup process based on the backup block information.

20 Claims, 8 Drawing Sheets

NON-BLOCKING BACKUP IN A LOG REPLAY NODE FOR TERTIARY INITIALIZATION

BACKGROUND

Due to the high volume of transactional activity on a primary node, it can be very time consuming for a secondary server to perform continuous log replay on log information received from the primary node. The ability of the secondary server to efficiently perform continuous log replay can be further strained if the secondary server is also responsible for initializing a tertiary node while performing the continuous log replay.

BRIEF DESCRIPTION OF THE DRAWINGS

The accompanying drawings are incorporated herein and form a part of the specification.

FIGS. 4A-4D are block diagrams illustrating example modifications to example boundaries of logical disk pages, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
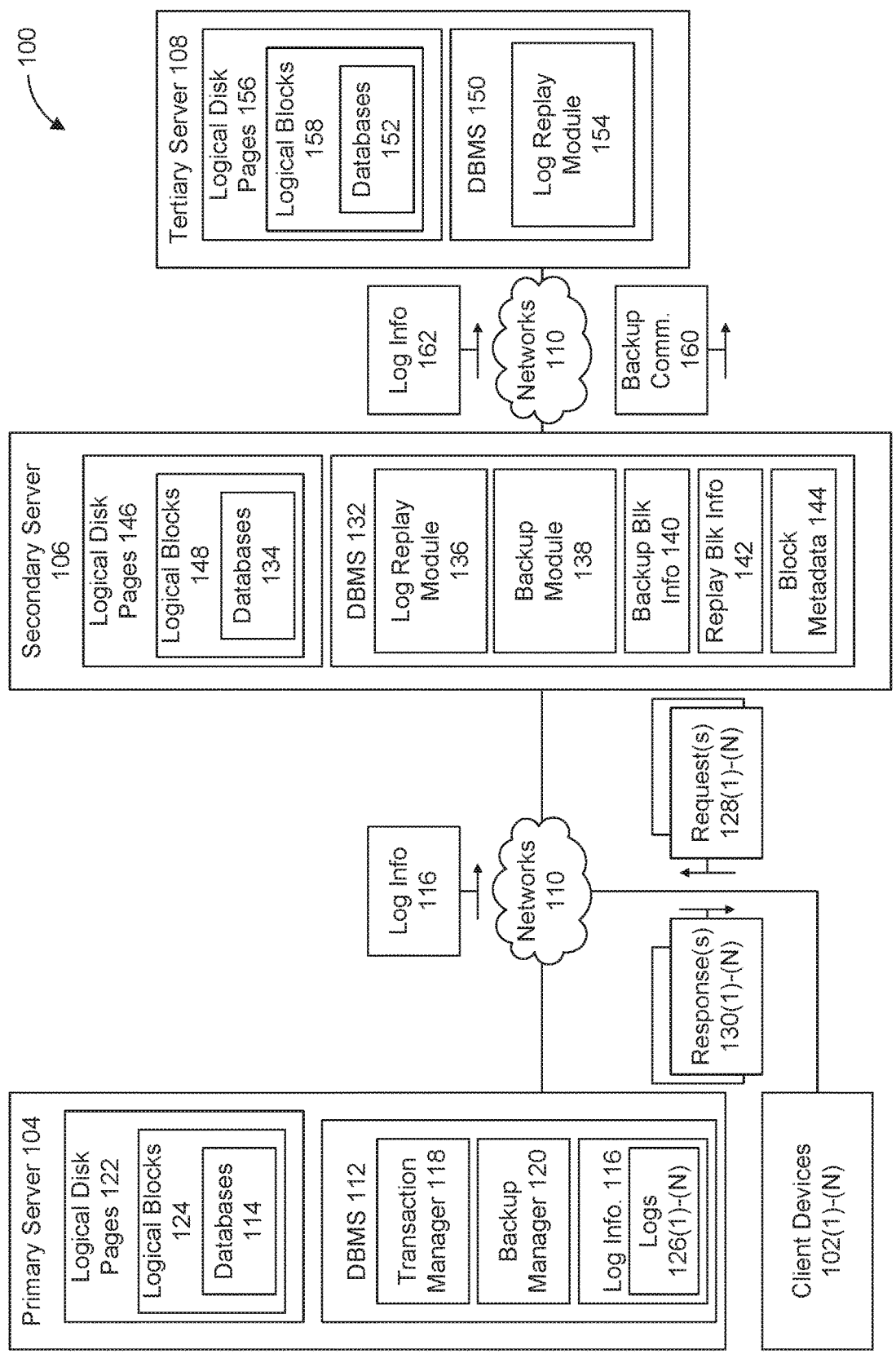
FIG. 1 is a block diagram of a tiered replication system 100 with support for non-blocking tertiary initialization in a log replay only node, according to some embodiments.

FIG. 1 illustrates an example embodiment of a tiered replication system 100 with support for non-blocking backup in a log replay node for tertiary initialization. As illustrated in FIG. 1, the tiered replication system 100 includes a plurality of client devices 102(1)-(N), a primary server 104, a secondary server 106, and a tertiary server 108. In the tiered replication system 100, the primary server 104, the secondary server 106, and the tertiary server 108 are configured for high availability and disaster recovery within the tiered replication system 100. For instance, the primary server 104 is an active node, while the secondary server 106 is a high availability node and the tertiary server 108 is a disaster recovery node. Further, the secondary server 106 is a mirror node of the primary server 104, and the tertiary server is a mirror node of the secondary server 106. As such, the secondary server 106 will become the active node if the primary server 104 fails, and the tertiary node may become the mirror node to the secondary server 106. The replication topology of the tiered replication system 100 provides the technical benefits of permitting the secondary server 106 to efficiently and quickly perform resource intensive log replay over database operations performed by the primary server 104, while concurrently invoking a backup of the primary database to initialize the tertiary server 108.

The plurality of client devices 102(1)-(N), the primary server 104, the secondary server 106, and the tertiary server 108 may communicate via a communication network(s) 110. The communication network(s) 110 may include any or all of a private network, personal area network (PAN), Local-Area Network (LAN), Wide-Area Network (WAN), or the Internet. Further, the connection between any of the plurality of client devices 102(1)-(N), the primary server 104, the secondary server 106, and the tertiary server 108, and the communication network(s) 110 may be a wireless connection (e.g., Bluetooth, Wi-Fi connection, etc.), or a wired connection (e.g., Ethernet, universal serial bus (USB), etc.), or a combination thereof.

The primary server 104 may include a database management system 112. Further, the database management system 112 may include one or more databases 114, log information 116, a transaction manager 118, and a backup manager 120. A "database" as used herein refers to an organized collection of data. In some embodiments, the individual databases 114 may include a plurality of data tables comprising data values (e.g., alphanumeric strings, integers, decimals, floating points, dates, times, binary values, Boolean values, and/or enumerations). Some examples of the databases 114 include columnar databases, relational databases, key-store databases, graph databases, and document stores. As illustrated in FIG. 1, the databases 114 may be stored on logical disk pages 122 comprising a plurality of logical blocks 124. In some examples, the logical disk pages 122 may be of a variable block size. In some other examples, the logical disk pages 122 may be a fixed size. For example, each logical disk page may include eight logical blocks 124. Further, the logical disk pages 122 may correspond to a persistent storage volume of the primary server 104 or an in-row memory store of the primary server 104.

As illustrated in FIG. 1, the log information 116 may include a plurality of database logs 126(1)-(N). Further, the database logs 126 may include log entries that record database operations performed on the databases 114. Some examples of database operations include read operations, delete operations, insert operations, update operations, and other types of database operations. In some examples, individual log entries may record the date and time of a database operation, the type of operation being performed, the column of the table being read or modified, and the value being inserted or modified.

Further, in some embodiments, individual databases 114 may be associated with more than one database log of the plurality of database logs 126. For instance, the database 114(1) may be associated a transaction log 126(1) with log entries corresponding to committed transactions performed on the database 114(1), and a point in time record log 126(2) with log entries corresponding to individual database operations performed on the database 114(1). As described in detail herein, the transaction log 126(1) may correspond to database operations and related data stored to persistent memory, while the point in time record ("PITR") log may further include database operations and related data stored to non-volatile memory.

The transaction manager 118 may coordinate transactions performed on the databases 114. A "database transaction" as used herein refers to one or more database operations performed as a single logical unit of work. In some examples, the transaction manager 118 may manage the completion of the database operations of a database transaction. Additionally, the transaction manager 118 may manage transaction commits and transaction rollbacks in response to attempts to perform database transactions on the databases 114.

The backup manager 120 coordinates periodic backup processes performed with respect to the databases 114 of the primary server 104. As used herein, "backing up" refers to copying and archiving computer data as "backup information" to be restored after a data loss event. In some examples, the backup manager 120 may periodically perform recovery checkpoint operations that store backup information to persistent storage of the primary server 104. A "recovery checkpoint" as used herein refers to a point in time representation of a database. For instance, a recovery checkpoint may correspond to a significant point in time during a transaction (e.g., a commit) to a database. Further, in some embodiments, the recovery checkpoint is associated with a restorable version (i.e., backup information) of a database 114 at the particular point in time.

The backup information may include content and metadata corresponding to a database at the time the recovery checkpoint operation is performed. Further, the backup manager 120 may use the backup information to restore the database 114 to its respective state at the point in time that the recovery checkpoint operation is performed. Additionally, or alternatively, the backup manager 120 may use the backup information to replicate the database 114 at the state of the database 114 at the point in time that the recovery checkpoint operation is performed.

In some embodiments, the backup manager 120 may not immediately perform a recovery checkpoint operation for a database transaction because it is computationally expensive to perform input/output (I/O) operations. For instance, it may be computationally expensive to perform input/output (I/O) operations to persistent storage. Instead, the database management system 112 may store data associated with a database operation in non-volatile memory. Further, the backup manager 120 may then periodically write the data corresponding to the database operation from non-volatile memory to the persistent storage as part of performing a recovery checkpoint operation. However, because the data of some database operations may not be immediately recovery checkpointed, there is a possibility of data loss if the primary server 104 crashes before the in-memory data is written to persistent storage. In an example embodiment, the database management system 112 can restore the data stored in non-volatile memory by restoring the database to the latest backup using the backup information, and replaying the PITR log 126(2) of the log information 116 as the PITR log 126(2) is not limited to transactions performed on the database.

Further, the transaction manager 118 and the backup manager 120 may work in concert to initialize the secondary server 106. For example, the transaction manager 118 and backup manager 120 may establish the secondary server 106 as a mirror node of the primary server 104 as of a certain point of time (e.g., a recovery checkpoint). During the secondary initialization process, the backup manager 120 may determine one or more logical blocks 124 that need to be backed up in order generate backup information corresponding to the state of the primary server 104 at the recovery checkpoint. Further, the backup manager 120 and the transaction manager 118 may employ synchronization mechanisms to manage access to shared resources during the backup process.

Additionally, the client devices 102 may send requests 128(1)-(N) to the primary server 104, and receive responses 130(1)-(N) from the primary server 104. In response to receipt of the requests 128(1)-(N), the primary server 104 may perform database operations on the databases 114. Further, the primary server 104 may send the responses 130(1)-(N) to the clients 102 in response to the database operations. Given that the primary server 104 is the active node, the client devices 102 are only able to communicate with the primary server 104. For instance, the client devices 102 may be unable to send requests 128(1)-(N) to the secondary server 106 or receive responses 130(1)-(N) from the secondary server 106.

The secondary server 106 may include a database management system. Further, the database management system may include one or more databases 134, a log replay module 136, a backup module 138 (also referred to as a "backup for tertiary initialization module" in some embodiments), backup block information 140, replay block information 142, and block metadata 144. In some embodiments, the individual databases 134 may include a plurality of data tables comprising data values (e.g., alphanumeric strings, integers, decimals, floating points, dates, times, binary values, Boolean values, and/or enumerations). Some examples of the databases 134 include columnar databases, relational databases, key-store databases, graph databases, and document stores. As illustrated in FIG. 1, the databases 134 may be stored on logical disk pages 146 comprising a plurality of logical blocks 148. In some examples, the logical disk pages 146 may be of a variable block size. Further, the block metadata 144 may identify the first blocks of the logical disk pages 146. In some other examples, the logical disk pages 146 may be a fixed size. For example, each logical disk page may include eight logical blocks 148. Further, the logical disk pages 146 may correspond to a persistent storage volume of the secondary server 106 or an in-row memory store of the secondary server 106.

As stated above, the secondary server 106 is a mirror node of the primary server 104. In particular, the secondary server 106 is a high availability node that uses the primary server 104 as a source node. In some examples, the secondary server 106 is a log replay only replication node. As such, the secondary server 106 keeps in sync with the primary server 104 solely via log replay performed by the log replay module 136. In some examples, the log replay module 136 may include multiple threads capable of individually performing the processes described in, for example, FIGS. 2, 6, and 7.

A "log replay" as used herein refers to identifying database operations recorded in a database log, and re-executing the database operations to achieve an intended state of the database. In some examples, the secondary server 106 receives the log information 116 from the primary server 104, and the log replay module 136 replays the logs 126 of the log information 116. For instance, the log replay module 136 may determine the replay block information that identifies the logical blocks 148 of the secondary server 106 that need to be modified in accordance with replaying the log information 116.

As described in detail herein, the log replay module 136 may perform a standard log replay process that entails replaying the log information 116, and a modified log replay process adapted in view of the invocation of a backup on the secondary server 106 by the backup module 138. In some examples, the modified log replay process is based on the backup block information 140 and the replay block information 142. As described herein, the modified log replay performs continuous log replay while assisting the backup process, thereby improving the speed of the backup process.

Further, as a log replay only replication node, the secondary server 106 may not be accessed by the client devices 102. For instance, while the secondary server 106 is a mirror node of the primary server 104, the client devices 102 are unable to send requests to the secondary server 106 and the secondary server 106 is unable to send responses to the client devices 102. Additionally, the secondary server 106 may not include common subsystems used by database management systems for database backup and disaster recover (e.g., a transaction manager, a backup manager, a distributed lock manager, etc.).

The tertiary server 108 is an additional disaster recovery node that uses the secondary server 106 as its source node. Further, the secondary server 106 is configured to invoke a backup for initializing the tertiary server 108 while concurrently performing its log replay operations via the log replay module 136. Therefore, if the primary server 104 fails and the secondary server 106 becomes the active node, the tertiary server 106 may assume the role of a mirror node within the tiered replication system 100 of FIG. 1.

As illustrated in FIG. 1, the tertiary server 108 may include a database management system. Further, the database management system may include one or more databases 152, and a log replay module 154. In some embodiments, the individual databases 152 may include a plurality of data tables comprising data values (e.g., alphanumeric strings, integers, decimals, floating points, dates, times, binary values, Boolean values, and/or enumerations). Some examples of the databases 152 include columnar databases, relational databases, key-store databases, graph databases, and document stores. As illustrated in FIG. 1, the databases 152 may be stored on logical disk pages 156 comprising a plurality of logical blocks 158. In some examples, the logical disk pages 156 may be of a variable block size. In some other examples, the logical disk pages 156 may be a fixed size. For example, each logical disk page may include eight logical blocks 158. Further, the logical disk page may correspond to a persistent storage volume of the tertiary server 108 or an in-row memory store of the tertiary server 108.

As described in detail herein, the backup module 138 invokes a backup on the secondary server 106 using a non-blocking process. In some embodiments, the tertiary server 108 may request that the backup initialization module invoke the backup on the secondary server 106. Further, the non-blocking process comprises invoking a backup on the secondary server 106 to generate backup information (e.g., backup block information 140) as of a recovery checkpoint, transmitting a backup communication 160 including the backup information 140 to the tertiary server 108, restoring the backup information 140 on the tertiary server 108, and replaying log activity (e.g., replay block information 142) succeeding the recovery checkpoint at the tertiary server 108. As a result of the non-blocking process, the databases 152 of the tertiary server 108 will mirror the databases 134 of the secondary server 106 as of a particular point in time. In some examples, the backup module 138 determines the backup block information 140 identifying the logical blocks 148 of the secondary server 106 that need to be backed up during the backup process. Additionally, the backup block information 140 may include a status of the backup process. For example, the status of the backup process may indicate whether a backup process is being performed and/or a current logical block of the secondary server 106 that is being backed up.

Once the tertiary server 108 is initialized, the log replay module 154 of the tertiary server 108 may periodically receive log information 162 from the secondary server 106. Further, the tertiary server 108 may keep in sync with the secondary server 106 via log replay performed by the log replay module 154 using the log information 162. As the mirror node to the secondary server 106, the client devices 102 may be unable to send requests 128 to the tertiary server 108 and the tertiary server 108 may be unable to send responses 130 to the client devices 102. Additionally, the tertiary server 108 may not include common subsystems used by database management systems for database backup and disaster recover (e.g., a transaction manager, a backup manager, a distributed lock manager, etc.).

Figure 2:
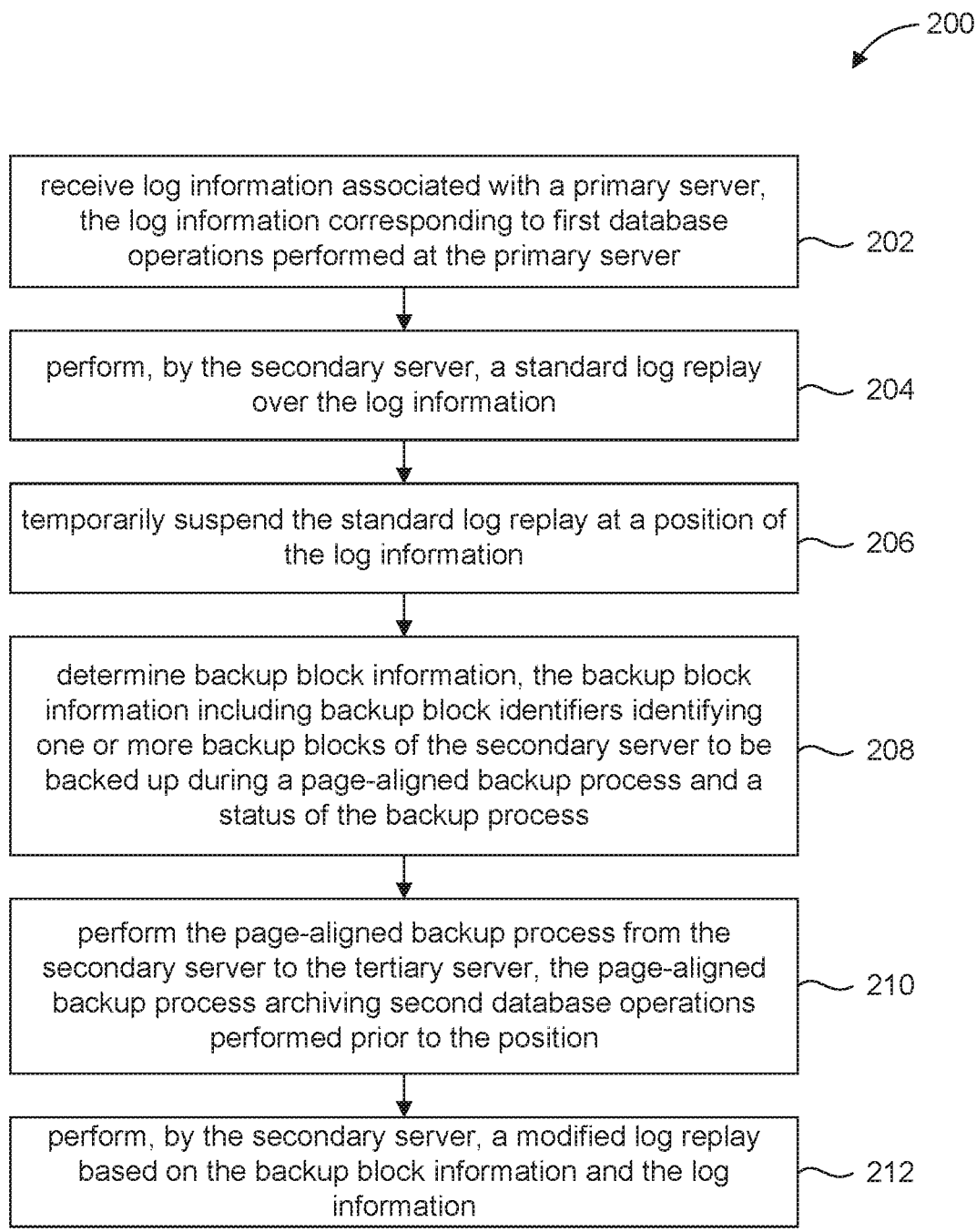
FIG. 2 is a flowchart illustrating a process for non-blocking tertiary initialization in a log replay node, according to some embodiments.

FIG. 2 is a flowchart illustrating a process for non-blocking backup for tertiary initialization in a log replay node, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

At 202, a secondary server receives log information associated with a primary server, where the log information corresponds to first database operations performed at the primary server. For example, the primary server 104 sends the log information 116 to the secondary server 106. Further, the log information 116 may include database logs 126 corresponding to database operations performed at the primary server 104.

At 204, the secondary server performs a standard log replay over the log information. For example, the log replay module 136 may perform a log replay based on the log information 116 (e.g., the PITR log 116(1)) received from the primary server 104. By performing the log replay, the secondary server 106 is able to act as an up to date mirror node to the primary server 104.

At 206, the secondary server temporarily suspends the standard log replay at a position of the log information. For example, the backup module 138 may invoke a backup on the secondary server 106 and instruct the log replay module 136 to briefly suspend the current log replay based on the log information 116.

In some examples, the log replay module 136 may briefly suspend the log replay after replaying the next recovery checkpoint log entry in a transaction log 126(1) or PITR log 126(2) of the log information. In some other examples, the log replay module 136 may briefly suspend the log replay after replaying any log entry in a transaction log 126(1) or PITR log 126(2) of the log information 116. For example, if the log replay module 136 is currently replaying a log entry of the transaction log 126(1), the log replay module 136 may suspend the log replay module 136 immediately after completing replay of the log entry in response to an instruction from the backup module 138. A "backup invocation point" as used herein refers to the particular point within the log information 116 at which the log replay is suspended.

At 208, the secondary server determines backup block information, where the backup block information includes backup block identifiers identifying one or more backup blocks of the secondary server to be backed up during a page-aligned backup process and a status of the backup process. For example, the backup module 138 may determine that the logical blocks 148 of the secondary server 106 currently store the content of the databases 134 as of the backup invocation point. In some examples, the backup block information 140 may include a bitmap (i.e., the backup block identifiers) with individual bits of the bitmap set to '1' when a logical block corresponding to an individual bit of the bitmap needs to be backed up during the backup process. Further, the backup block information 140 may indicate whether the backup process is currently being performed, and/or the current logical block of the storage volume that is being backed up by the backup process.

At 210, the secondary server performs the page-aligned backup process from the secondary server to the tertiary server, where the page-aligned backup process archives second database operations that were performed prior to the position. For example, the backup module 138 may backup the logical blocks 148 identified in the backup block information 140 to the tertiary server 108. Further, as the backup process is performed, the backup module 138 may update the backup block information 140 to represent the progress of the backup process.

For instance, the backup module 138 may update the backup block information 140 to indicate that the backup process is complete. In some other instances, the backup module 138 may update the backup block information 140 to indicate that one or more logical blocks 148 of the secondary server 106 have been backed up. For example, after a logical block is backed up by the backup process, the backup process may remove an identifier of the logical block from the backup block identifiers of the backup block information 140. In addition, the backup process may update a counter value indicating an identifier (e.g., index) of a logical block currently being backed up by the backup process.

In some examples, the databases 134 of the secondary server 106 may be encrypted. Further, the backup module 138 may decrypt the databases 134, and generate a clear text backup of the databases 134. In some embodiments, the encryption may be at the logical disk page level. Further, the secondary server 106 may use the block metadata 144 to determine page boundaries for decrypting the logical disk page. In some embodiments, the tertiary server 108 may re-encrypt the clear text back up using a new encryption.

At 212, the secondary server performs a modified log replay based on the backup block information and the log information. For example, the log replay module 136 may determine the replay block information 142 including replay block identifiers identifying the logical blocks 148 that have been modified by database operations succeeding the backup invocation point. Further, the log replay module 136 may perform a log replay over the logical blocks corresponding to the replay block identifiers thus terminating the temporary suspension of the log replay.

As described in further detail herein, the log replay process may be modified to ensure that the concurrent log replay and the backup process do not both process the same logical blocks 148 using the backup block information 140. For instance, the log replay thread may identify blocks that will be backed up by the backup process and replayed by the log replay thread, and remove the identified blocks from the list of blocks to be backed up by the backup process. As a result, the processing load of the log replay module 136 is decreased by avoiding the redundant processing of the same set of logical blocks for backup by the log replay. In addition, the speed of the backup process is increased and the secondary server 106 avoids creating redundant copies of the same data at the tertiary server 108. Further, the suspension of the log replay is brief thereby reducing the overhead of concurrency control between the log replay module 136 and the backup module 138.

Figure 3:
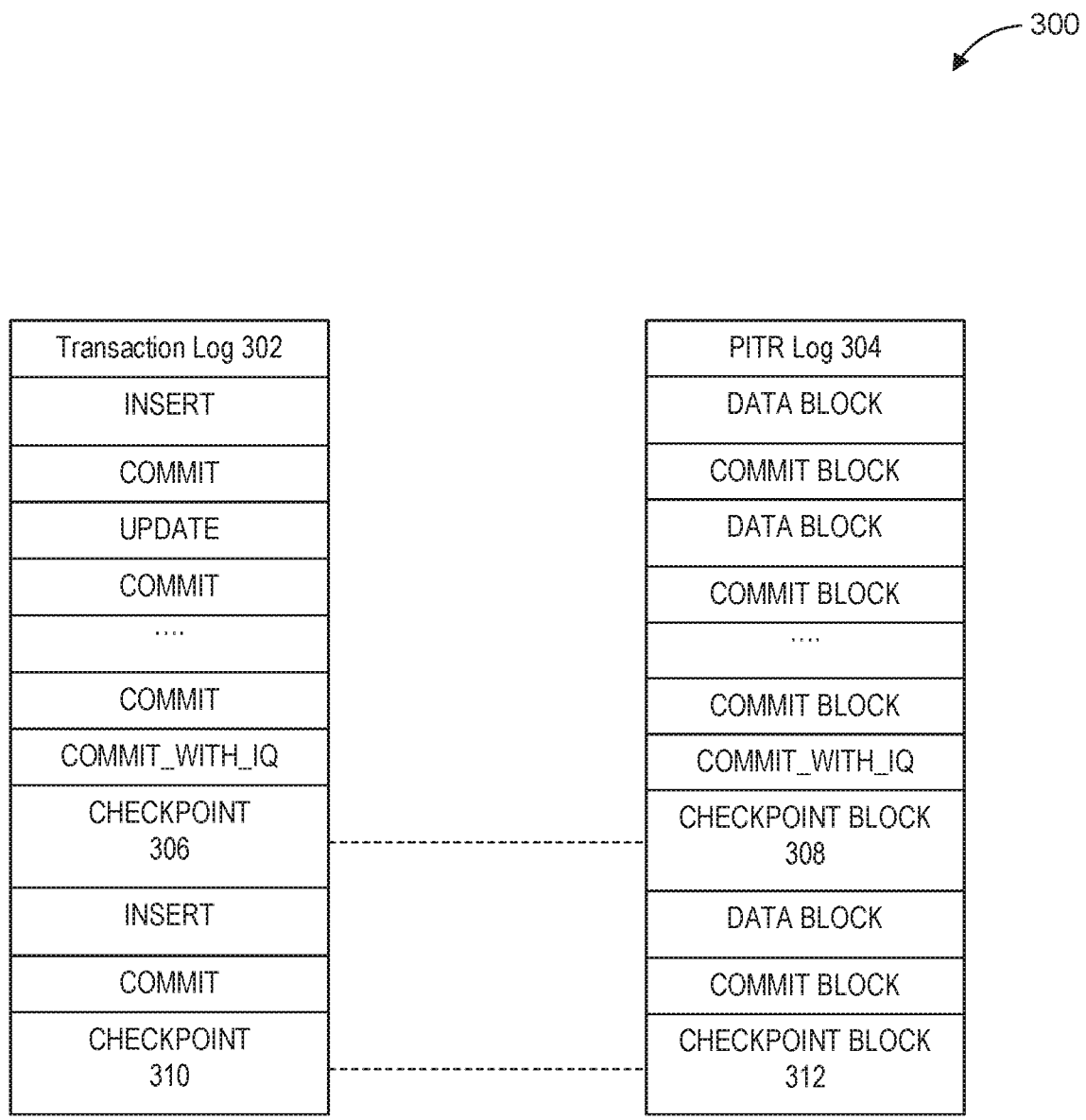
FIG. 3 illustrates example log information, according to some embodiments.

FIG. 3 illustrates log information, according to some embodiments. FIG. 3 illustrates a transaction log 302 (e.g., the transaction log 126(1)) and a PITR log 304 (e.g., the PITR log 126(2)). Additionally, FIG. 3 illustrates the relationship between log entries of the transaction log 302 and the PITR log 304. In some embodiments, the transaction log may be referred to as a "system catalog transaction log." For example, the log entry 306 records a recovery checkpoint operation, and log entry 308 of the PITR log 304 records the same recovery checkpoint. Similarly, the log entry 310 records a recovery checkpoint operation in the transaction log 302, and log entry 312 of the PITR log 304 records the same recovery checkpoint. In some embodiments, the PITR log 304 subsumes the transaction log 302. As such, replaying the PITR log 302 also replays the log entries of the transaction log 302.

FIGS. 4A-4D are block diagrams illustrating modifications to the boundaries of logical disk pages, according to some embodiments.

Figures 4A, 4B, 4C, 4D:
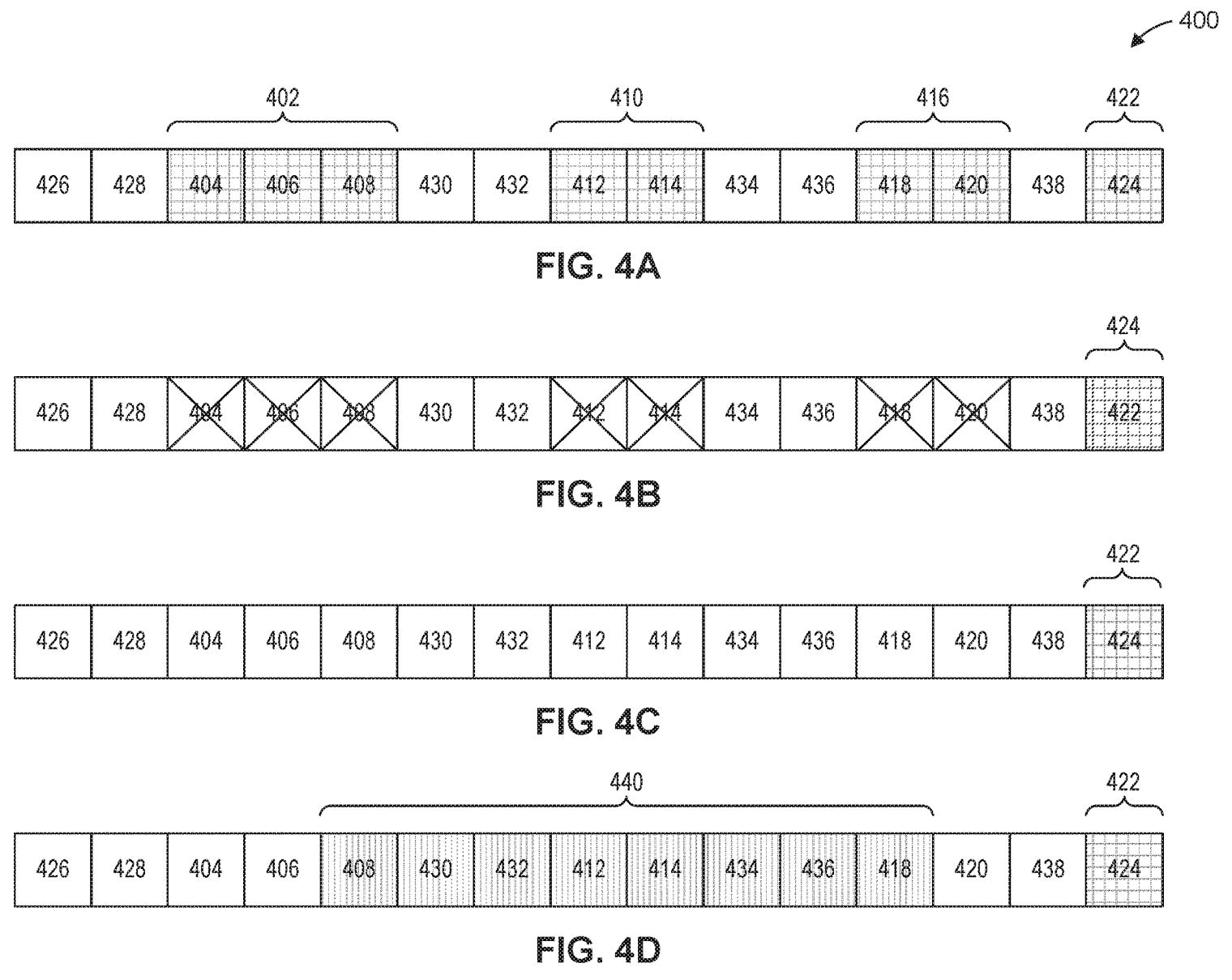

As illustrated in FIG. 4A, the logical disk page 402 (e.g., the logical disk pages 146) includes logical blocks 404, 406, and 408 (e.g., the logical blocks 148), logical disk page 410 includes logical blocks 412 and 414, logical disk page 416 includes logical blocks 418 and 420, and logical disk page 422 includes logical block 424. The logical pages 402, 410, 416, and 422 are allocated pages within a file system of a server (e.g., the secondary server 106). In addition, in FIG. 4A, the logical blocks 426-438 are currently unallocated within the file system of the secondary server 106.

FIG. 4B illustrates the performance of transactions on the logical disk pages of a server. In particular, FIG. 4B illustrates transactions resulting in the deallocation of logical disk pages 402, 410, and 416.

FIG. 4C. illustrates the logical blocks 404-408, 412-414, 418, 420, and 424-438 after the performance of the transactions that deallocated the logical disk pages 402, 410, and 416 in FIG. 4B. As illustrated in FIG. 4C, the logical blocks 404, 406, 408, 412, 414, 418 and 420 are unallocated.

FIG. 4D illustrates the performance of transactions on the server. In particular, the transactions result in the allocation of logical disk page 440. As illustrated in FIG. 4D, the newly allocated logical disk page 440 includes the logical blocks 408, 412, 414, 418, 430, 432, 434, and 436.

Suppose that FIG. 4A illustrates the state of the logical blocks 404-408, 412-414, 418, 420, and 424-438 at the backup invocation point. Then in this example, the backup block information 140 would be based on the state of the logical disk pages 146 and the logical blocks 148 illustrated in FIG. 4A. FIG. 4D may further illustrate the state of the logical blocks 404-408, 412-414, 418, 420, and 424-438 based on database operations performed after backup invocation point. Further, the replay block information 142 may be based on the state of the logical disk pages 146 and the logical block illustrated in FIG. 4D. For example, the PITR log 126(2) may record the one or more transactions that deallocated the logical disk pages 402, 410, and 416, and the one or more transactions that one or more transactions the allocated logical disk page 440.

As illustrated in FIGS. 4A-4D, in some embodiments, the logical disk pages 146 and logical blocks 148 are continually modified by the replay of the log information corresponding to database operations performed on the primary node. For example, the logical disk page boundaries are continually modified by the log replay of database operations which cause re-allocation of logical blocks 148 previously allocated to different logical disk pages 146 as of the backup invocation point.

Figure 5:
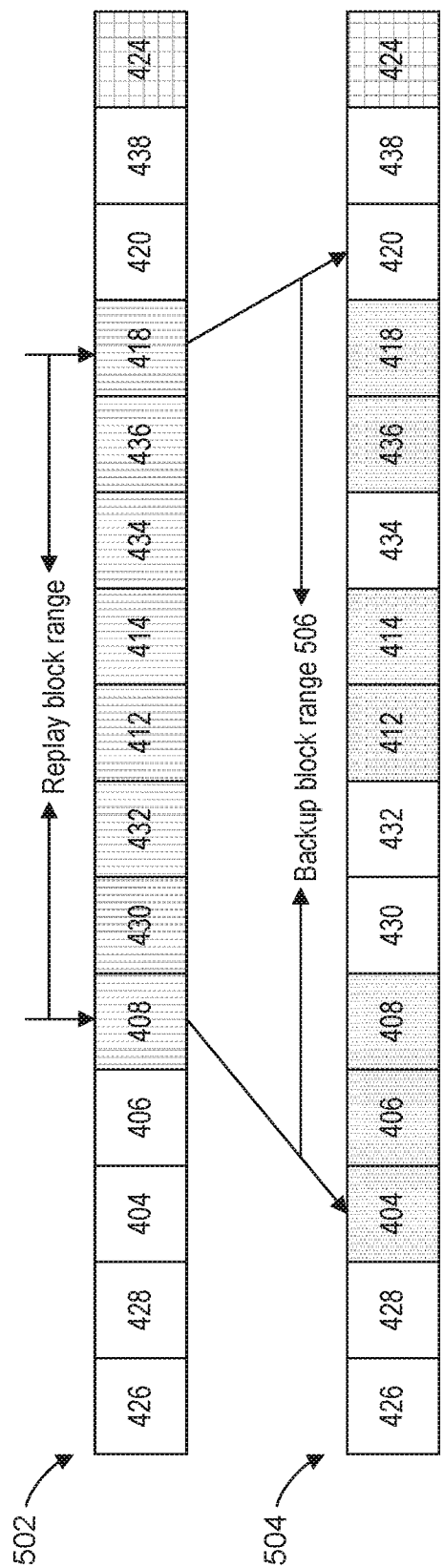
FIG. 5 illustrates example relationship between example replay block information and backup block information, according some embodiments.

FIG. 5 illustrates the relationship between replay block information 142 and backup block information 140, according some embodiments. The logical block representation 502 illustrates the state of the logical blocks 404-408, 412-414, 418, 420, and 424-438 during a log replay at a particular point in time after a checkpoint (e.g., the backup invocation point). More specifically, the particular point in time is after the deallocation of logical disk pages 402, 410, and 416 of FIG. 4, and the allocation of logical disk page 440. The logical block representation 504 illustrates the state of the logical blocks 404-408, 412-414, 418, 420, and 424-438 at the backup invocation point.

Further, FIG. 5 illustrates the backup block range 506 of the backup block information 140 corresponding to the logical disk page 440 (i.e., the replay block information 142). As described in detail herein, in some embodiments, a secondary server (e.g., the secondary server 106) determines the backup block range 506 based on the logical disk page 440, and ensures that a backup process does not backup the logical blocks of the backup block range 506 by removing the backup block range 506 from the backup block information (e.g., backup block information 140) indicating the logical blocks that need to be backed up to a tertiary server (e.g., the tertiary server 108). By removing the backup block range 506, the secondary server 106 ensures that each logical block 148 or each logical disk page 146 is backed up by only one of the log replay module 154 or the backup process of the backup module 138. As a result, the secondary server 106 is prevented from creating a redundant copy of the same data at the tertiary server 108.

Figure 6:
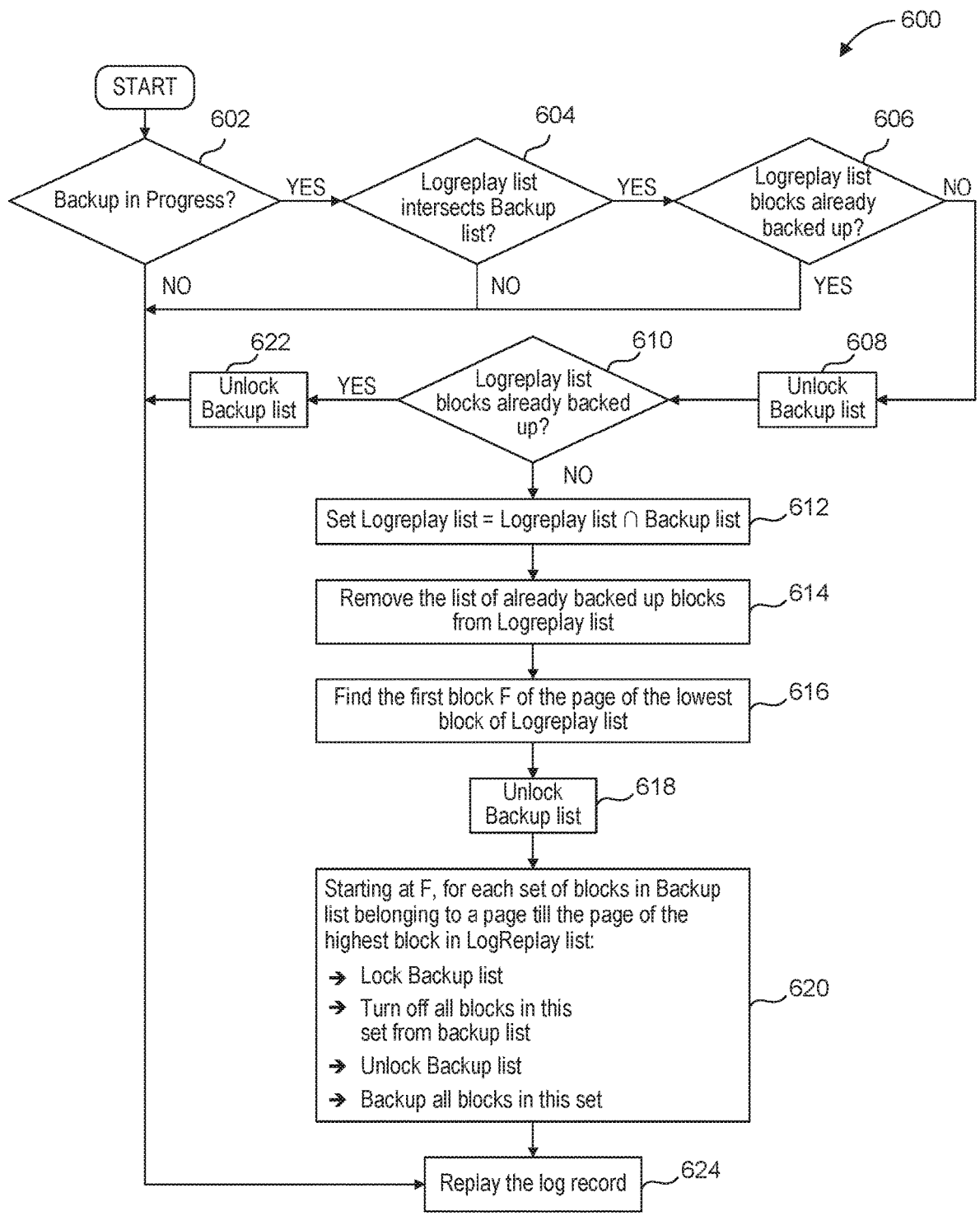
FIG. 6 is a flowchart illustrating a process for non-blocking backup for tertiary initialization in a log replay node, according to some embodiments.

FIG. 6 is a flowchart illustrating a process for non-blocking tertiary initialization in a log replay node, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 1-5. However, method 600 is not limited to that example embodiment.

At 602, the secondary server determines whether a backup is in progress. For example, the log replay module 136 may determine whether the backup module 138 is performing a backup process based on backup block information 140. In some embodiments, the log replay module 136 may determine whether the backup process is in progress by checking the status of the backup process included in the backup block information 140. If the backup process is in progress the process proceeds to step 604. Otherwise the process proceeds to step 624.

At 604, the secondary server determines whether a log replay list intersects a backup list. For example, the log replay module 136 may compare the replay block information 142 to the backup block information 140. In particular, the log replay module 136 may compare the backup block identifiers to the replay block identifiers, and determine which of the logical blocks 148 are identified by the backup block identifiers and replay block identifiers. If some of the logical blocks 148 are identified in both the backup block information 140 and the replay block information 142, the process proceeds to step 606. Otherwise the process proceeds to step 624.

At 606, the secondary server determines whether the blocks of the replay list have been backed up. For example, the log replay module 136 may compare the replay block information 142 to the backup block information 140. In particular, the log replay module 136 may determine whether the status of the backup process indicates that the logical blocks 148 identified by the replay block identifiers have already been backed up by the backup process. In some embodiments, the status of the backup process may indicate the index of the block being backed up. Further, the log replay module 136 may determine that a replay block has backed up when the index of the backup block currently being backed up is greater than the index of the replay block. If logical blocks 148 identified in the replay block information 142 have been backed up, the process proceeds to step 624. Otherwise the process proceeds to step 608.

At 608, the secondary server locks the backup list. For example, the secondary server 106 may prevent the backup block identifiers of backup block information 140 from being modified by the log replay module 136 or the backup module 138.

At 610, the secondary server determines whether the blocks of the replay list have been backed up. For example, the log replay module 136 may compare the replay block information 142 to the backup block information 140. In particular, the log replay module 136 may determine whether the status of the backup process indicates that the logical blocks 148 identified by the replay block identifiers have already been backed up by the backup process. In some embodiments, the status of the backup process may indicate the index of the logical block being backed up. Further, the log replay module 136 may determine that a replay block has backed up when the index of the backup block currently being backed up is greater than the index of the replay block. If logical blocks 148 identified in the replay block information 142 have been backed up, the process proceeds to step 622, wherein the secondary server unlocks the backup list. For example, the secondary server 106 may allow the log replay module 136 and/or the backup module 138 to modify the backup block identifiers of backup block information 140. Next after step 622, the process proceeds to step 624.

If it is determined in 610 that logical blocks 148 identified in the replay block information 142 have not been backed up, the process proceeds to step 612.

At 612, the secondary server determines a modified log replay list based on the union of the initial replay list and the backup list. For example, the log replay module 136 may compare the replay block information 142 to the backup block information 140. In particular, the log replay module 136 may compare the backup block identifiers to the replay block identifiers, and determine which of the logical blocks 148 are identified in the backup block identifiers of the backup block information 140 and the replay block identifiers of the replay backup information.

At 614, the secondary server updates the modified log replay list by removing logical blocks that have already been backed up by the backup process. For example, the log replay module 136 may determine modified replay block identifiers including identifiers of the logical blocks 148 that are identified in the backup block identifiers of the backup block information 140 and the replay block identifiers of the replay block information 142.

At 616, the secondary server determines the first block of a page including the lowest logical block of the modified replay list. As described in further detail with respect to FIG. 7, the log replay module 136 may determine the logical disk page that includes the lowest block of the logical blocks 148 associated with the modified replay block identifiers in embodiments in which the logical disk page size is variable. In some other embodiments, there is no possibility of logical disk page boundary changing between the backup invocation point and the log replay. In these embodiments, the first data block identified in the replay block identifiers is guaranteed to be the first logical block of its logical disk page.

At 618, the secondary server unlocks the backup list. For example, the secondary server 106 may allow the log replay module 136 and/or the backup module 138 to modify the backup block identifiers of backup block information 140.

At 620, the secondary server determines the log replay backup list, and removes the log replay backup list from the backup block information. For instance, the log replay module 136 may identify a first page including the lowest block of the logical blocks 148 associated with the modified replay block identifiers. Further, the log replay module 136 may identify a second page including the highest block of the logical blocks 148 associated with the modified replay block identifiers. Additionally, the log replay module 136 may identify each of the one or more logical blocks 148 identified in the backup block identifiers belonging to a page between the first page and the second page. In some embodiments, the pages ranging from the first page and the second page may correspond to the backup block range 506.

Further, the log replay module 136 may lock the backup block information 140, update the backup block information 140 by removing the backup block identifiers corresponding to the logical blocks 148 belonging to a page between the first page and the second page at the backup invocation point, and unlock the backup block information 140. In addition, the log replay module 136 may backup the logical blocks 148 identified as belonging to a page between the first page and the second page. As such, the log replay module 136 takes responsibility for backing up the logical blocks 148 identified as belonging to a page between the first page and the second page, and not the backup process implemented by the backup module 138.

At 624, the secondary server replays the log record. For example, the log replay module 136 may replay the log information 116.

Figure 7:
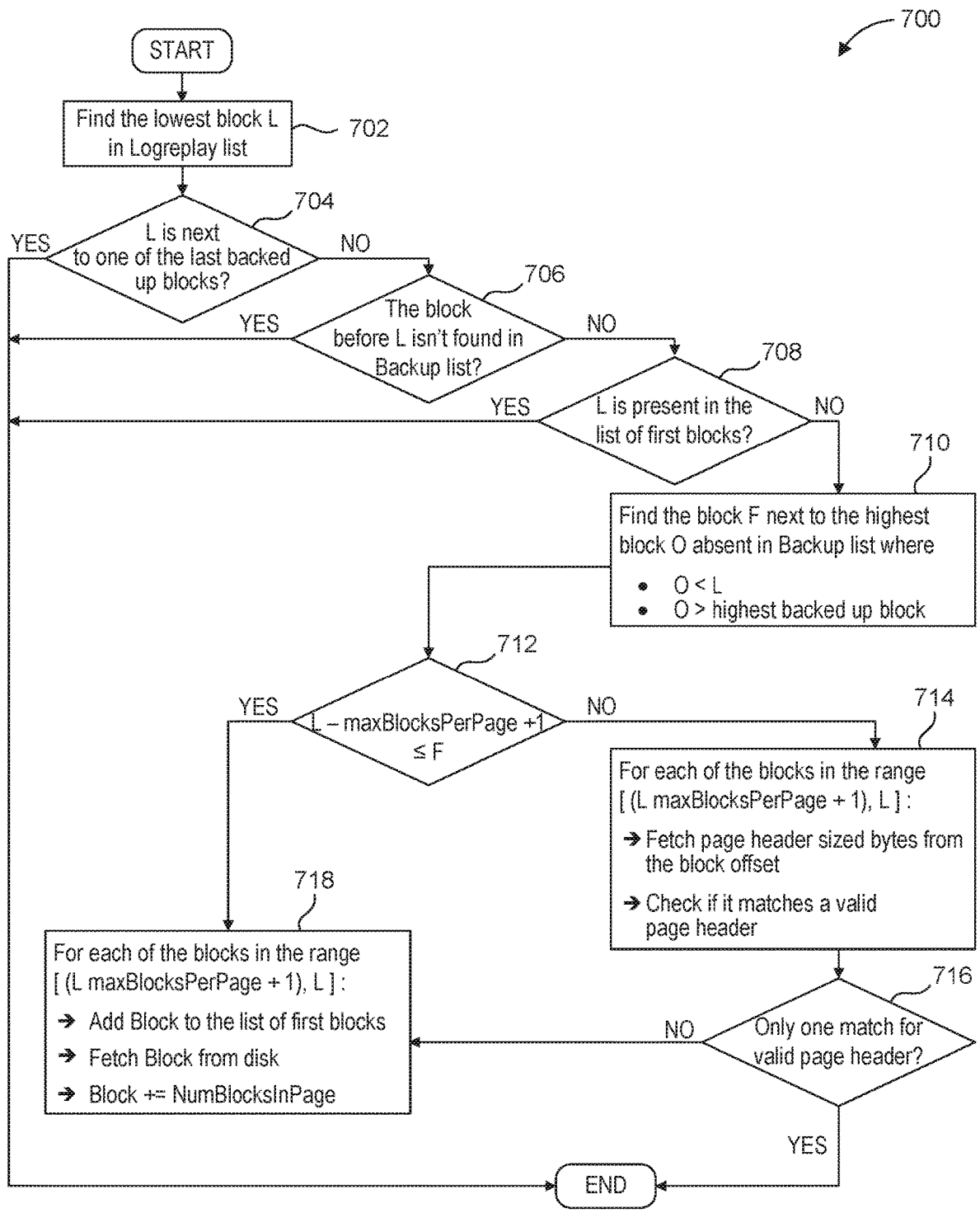
FIG. 7 is a flowchart illustrating a process for determining a boundary of a logical disk page as of a backup invocation point in view of replay block information, according to some embodiments.

FIG. 7 is a flowchart illustrating a process 700 for determining a boundary of a logical disk page as of a backup invocation in view of replay block information, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIGS. 1-5. However, method 700 is not limited to that example embodiment.

At 702, the secondary server determines the lowest logical block in a log replay list. For example, the log replay module 136 may identify that logical block 508 is the lowest block of the logical blocks 148 identified by the replay block identifiers of the replay block information 142.

At 704, the secondary server determines whether the lowest logical block immediately follows a backup block that was recently backed up. For example, the log replay module 136 may determine whether the logical block 508 immediately follows the last logical block backed up by the backup module 138 as indicated by the backup block information 140. In some embodiments, the log replay module 136 may determine if logical block 506 was logical block most recently backed up based on the status of the backup process as indicated by the backup block information 140. If the lowest logical block in the log replay list immediately follows a backup block that was recently backed up, then the first block of the logical disk page is the lowest logical block identified in the replay block information 142 as of the backup invocation point, and method 700 ends. Otherwise the process proceeds to step 706.

At 706, the secondary server determines whether the backup list includes the logical block immediately preceding the lowest logical block. For example, the log replay module 136 may determine whether the backup block identifiers of the backup block information 140 includes a backup block identifier corresponding to the logical block 506. If the backup list does not include the logical block immediately preceding the lowest logical block, then the first block of the logical disk page as of the backup invocation point is the lowest logical block identified in the replay block information 142, and method 700 ends. Otherwise the process proceeds to step 708.

At 708, the secondary server determines whether a list of known first blocks of the allocated pages includes the lowest logical block of the replay block information. For example, the secondary server 106 may maintain the block metadata 144 which includes a list of the first logical blocks of the logical disk pages (e.g., the logical disk pages 502, 510, 516, and 522) of the secondary server 106. As an example, the block metadata 144 of the logical disk page 502 would indicate that the logical block 504 was the first logical block of the logical disk page 502 at a particular point in time. Further, the secondary server 106 may determine whether the logical block 508 is included in the list of known first blocks of the logical disk pages 146. If the list of known first blocks of the allocated pages includes the lowest logical block of the replay block information 142, then the first block of the logical disk page is the lowest logical block identified in the replay block information 142 as of the backup invocation point, and method 700 ends. Otherwise the process proceeds to step 710.

At 710, the secondary server determines the highest unallocated logical block according to the backup block information that is lower than the lowest logical block of the replay block information, and greater than the highest backed up logical block according to the backup block information. Further, the secondary server prospectively identifies the logical block immediately after the identified unallocated logical block as the first logical block of the logical disk page including the first logical block of the replay block identifiers.

At 712, the secondary server determines whether the identified unallocated logical block belongs to the range of logical blocks corresponding to a proposed max-sized logical disk page ending at the lowest logical block of the replay block information. If the identified unallocated logical block belongs to the range of blocks corresponding to the proposed max-sized logical disk page ending at lowest logical block of the replay block information, then the process proceeds to 718. Otherwise the process proceeds to step 714.

At 714, for each of the logical blocks belonging to the proposed max-sized page ending at the lowest logical block of the replay block information, the secondary server retrieves page-header sized bytes from the beginning of the each of the logical blocks and determines if any of the retrieved bytes match a valid page-header.

At 716, the secondary server determines whether only one of the logical blocks has retrieved bytes that match a valid page-header. If the secondary server identifies only one of the logical blocks as having retrieved bytes that match a valid page-header, that identified logical block is the first logical block of the logical disk page containing the lowest logical block identified in the replay block information block as of the backup invocation point, and method 700 ends. Otherwise the process proceeds to step 718.

At 718, for each first logical block of a logical disk page starting from the identified unallocated logical block to the first logical block that shares a page with the lowest logical block, the secondary server retrieves the first logical block, adds the first logical block to the block metadata (e.g., the list of known first blocks), determines the size of the associated page, and traverses the backup block information to the next first logical block.

As the secondary server 106 traverses the backup blocks identified in the backup block information 140, the secondary server 106 will eventually retrieve a first logical block where an index of the first logical block and the size of the associated logical disk page indicate that the first logical block and the lowest logical block 508 belonged to the same page as of the backup invocation point.

For example, the secondary server 106 would retrieve the first logical block 504 and the associated page size (i.e., three logical blocks) would indicate that the logical blocks 506 and 508 were also logical blocks in the same page as 504 at the backup invocation point. Given that the lowest logical block of the replay block information 142 is the logical block 508, the secondary server 106 would determine that the logical block 504 was the first logical block of the logical disk page that included the lowest logical block of the replay block information 142 at the backup invocation point.

Figure 8:
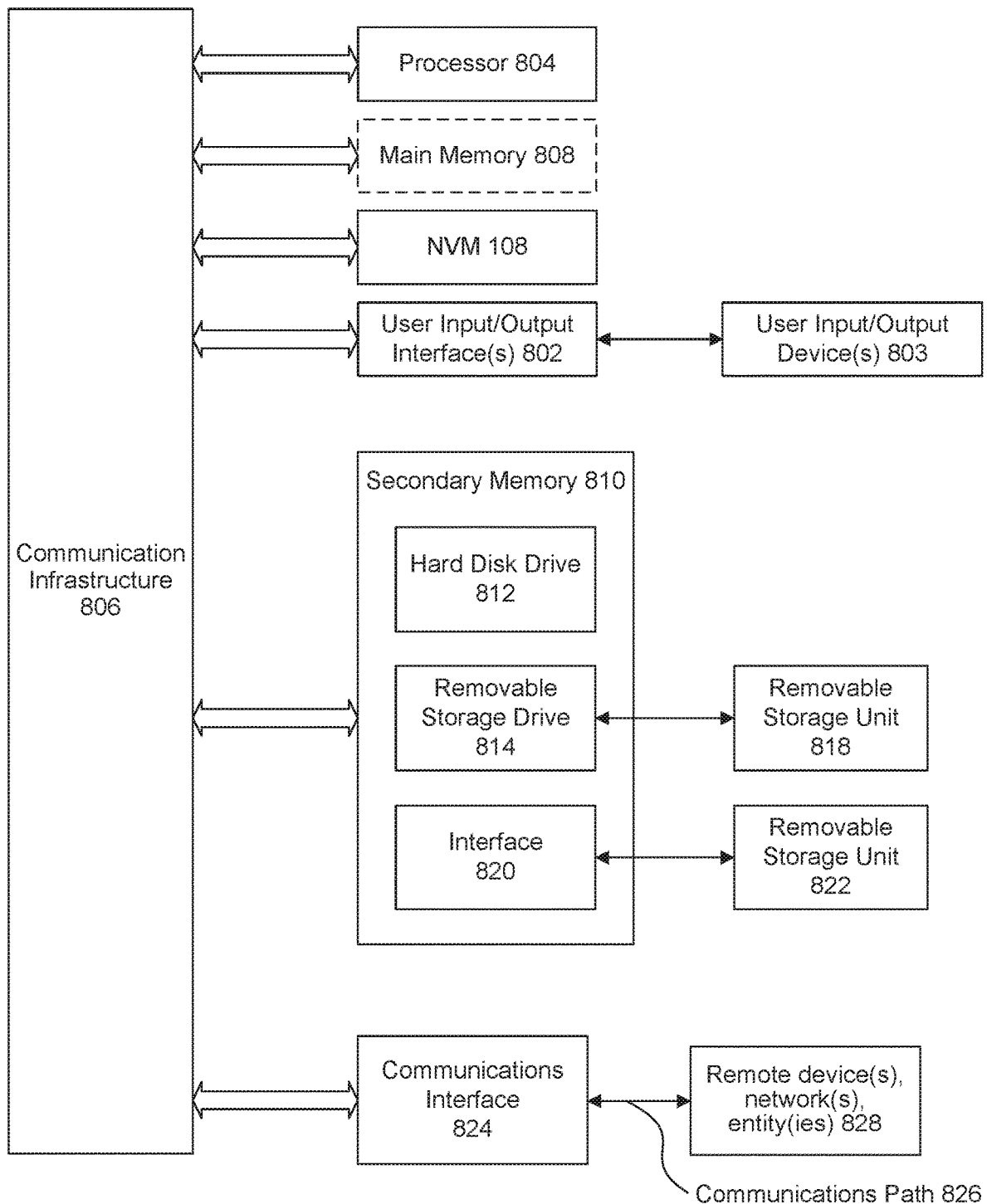
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for initializing a tertiary server within a three-tiered replication system, comprising:
    receiving log information associated with a primary server, the log information corresponding to first database operations performed at the primary server;
    performing, by the secondary server, a standard log replay over the log information;
    temporarily suspending the standard log replay at a position of the log information;
    determining backup block information, the backup block information including backup block identifiers identifying one or more backup blocks of the secondary server to be backed up during a page-aligned backup process and a status of the backup process;
    performing the page-aligned backup process from the secondary server to the tertiary server, the page-aligned backup process associated with second database operations performed prior to the position; and
    performing, by the secondary server, a modified log replay based on the backup block information and the log information.

2. The method of claim 1, wherein suspending the standard log replay at the position of the log information, comprises suspending the standard log replay at a recovery checkpoint of the log information.

3. The method of claim 1, wherein performing the modified log replay based on the backup block information and the log information, comprises:
    determining replay block identifiers identifying one or more replay blocks to be modified by third database operations performed after the position; and
    determining, based on the backup information, that none of the backup block identifiers are the same as the replay block identifiers; and
    replaying the log information.

4. The method of claim 1, wherein performing the modified log replay based on the backup block information and the log information, comprises:
    determining that the backup process is complete based on the backup block information; and
    replaying the log information.

5. The method of claim 1, wherein the backup block identifiers are initial backup block identifiers, and performing the modified log replay based on the backup block information and the log information, comprises:
    determining initial replay block identifiers identifying one or more replay blocks to be modified by third database operations performed after the position; and determining modified replay block identifiers corresponding to the initial replay block identifiers having a matching backup block identifier of the backup block identifiers;
determining a first page including a first block of the modified replay block identifiers;
determining a second page including a last block of the modified replay block identifiers;
determining a range of the one or more replay blocks spanning from the first page to the second page;
determining log replay backup blocks of the one or more backup blocks, the log replay backup blocks corresponding to the range; and
determining modified backup block identifiers by removing the initial backup block identifiers corresponding to the log replay backup blocks.

6. The method of claim 5, wherein performing the page-aligned backup process from the secondary server to the tertiary server, comprises:
performing the page-aligned backup process based on the modified backup block identifiers.

7. The method of claim 1, wherein the one or more backup blocks are encrypted backup blocks, and performing the page-aligned backup process from the secondary server to the tertiary server, comprises:
determining clear text backup blocks based on decrypting the encrypted backup blocks; and
backing up the clear text backup blocks to the tertiary server.

8. The method of claim 1, wherein the primary server includes at least one of an in-memory row store or an in-memory column store database.

9. The method of claim 1, wherein the secondary server includes a log replay only server that does not include at least one of a transaction manager, checkpoint capabilities, or a backup manager.

10. A non-transitory computer-readable device having instructions stored thereon that, when executed by at least one computing device, causes the at least one computing device to perform operations comprising:
receiving log information associated with a primary server, the log information corresponding to first database operations performed at the primary server;
performing, by the secondary server, a standard log replay over the log information;
temporarily suspending the standard log replay at a position of the log information;
determining backup block information, the backup block information including backup block identifiers identifying one or more backup blocks of the secondary server to be backed up during a page-aligned backup process and a status of the backup process;
performing the page-aligned backup process from the secondary server to a tertiary server, the page-aligned backup process associated with second database operations performed prior to the position; and
performing a modified log replay based on the backup block information and the log information.

11. The non-transitory computer-readable device of claim 10, wherein the one or more backup blocks are encrypted backup blocks, and performing the page-aligned backup process from the secondary server to the tertiary server, comprises:
determining clear text backup blocks based on decrypting the encrypted backup blocks; and
backing up the clear text backup blocks to the tertiary server.

12. The non-transitory computer-readable device of claim 10, wherein suspending the standard log replay at the position of the log information, comprises suspending the standard log replay at a recovery checkpoint of the log information.

13. The non-transitory computer-readable device of claim 10, wherein the backup block identifiers are initial backup block identifiers, and performing the modified log replay based on the backup block information and the log information, comprises:
determining initial replay block identifiers identifying one or more replay blocks to be modified by third database operations performed after the position; and
determining modified replay block identifiers corresponding to the initial replay block identifiers having a matching backup block identifier of the backup block identifiers;
determining a first page including a first block of the modified replay block identifiers;
determining a second page including a last block of the modified replay block identifiers;
determining a range of the one or more replay blocks spanning from the first page to the second page;
determining log replay backup blocks of the one or more backup blocks, the log replay backup blocks corresponding to the range; and
determining modified backup block identifiers by removing the initial backup block identifiers corresponding to the log replay backup blocks.

14. The non-transitory computer-readable device of claim 13, wherein performing the page-aligned backup process from the secondary server to the tertiary server, comprises:
performing the page-aligned backup process based on the modified backup block identifiers.

15. The non-transitory computer-readable device of claim 10, wherein the secondary server includes a log replay only server that does not include at least one of a transaction manager, checkpoint capabilities, or a backup manager.

16. A secondary server system, comprising:
a memory; and
at least one processor coupled to the memory and configured to:
receive log information associated with a primary server, the log information corresponding to first database operations performed at the primary server;
perform a standard log replay over the log information;
temporarily suspend the standard log replay at a position of the log information;
determine backup block information, the backup block information including backup block identifiers identifying one or more backup blocks of the memory to be backed up during a page-aligned backup process and a status of the backup process;
perform the page-aligned backup process from the memory to a tertiary server, the page-aligned backup process associated with second database operations performed prior to the position; and
perform a modified log replay based on the backup block information and the log information.

17. The secondary server system of claim 16, wherein suspending the standard log replay at the position of the log information, comprises suspending the standard log replay at a recovery checkpoint of the log information.

18. The secondary server system of claim 16, wherein the backup block identifiers are initial backup block identifiers, and to perform the modified log replay based on the backup block information and the log information, the at least one processor is configured to:
  determine initial replay block identifiers identifying one or more replay blocks to be modified by third database operations performed after the position;
  determine modified replay block identifiers corresponding to the initial replay block identifiers having a matching backup block identifier of the backup block identifiers;
  determine a first page including a first block of the modified replay block identifiers;
  determine a second page including a last block of the modified replay block identifiers;
  determine a range of the one or more replay blocks spanning from the first page to the second page;
  determine log replay backup blocks of the one or more backup blocks, the log replay backup blocks corresponding to the range; and
  determine modified backup block identifiers by removing the initial backup block identifiers corresponding to the log replay backup blocks.

19. The secondary server system of claim 18, wherein to perform the page-aligned backup process from the memory to the tertiary server, the at least one processor is configured to: perform the page-aligned backup process based on the modified backup block identifiers.

20. The secondary server system of claim 16, wherein the one or more backup blocks are encrypted backup blocks, and performing the page-aligned backup process from the secondary server to the tertiary server, comprises:
  determining clear text backup blocks based on decrypting the encrypted backup blocks; and
  backing up the clear text backup blocks to the tertiary server.

* * * * *